United States Patent
Chhabra et al.

(10) Patent No.: US 11,239,997 B2
(45) Date of Patent: *Feb. 1, 2022

(54) TECHNIQUES FOR CIPHER SYSTEM CONVERSION

(71) Applicant: INTEL CORPORATION, Santa Clara, CA (US)

(72) Inventors: Siddhartha Chhabra, Portland, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,746

(22) Filed: May 30, 2019

(65) Prior Publication Data

US 2019/0296893 A1    Sep. 26, 2019

Related U.S. Application Data

(63) Continuation of application No. 15/394,516, filed on Dec. 29, 2016, now Pat. No. 10,341,087.

(51) Int. Cl.
*H04L 9/06* (2006.01)
*G06F 21/53* (2013.01)
(Continued)

(52) U.S. Cl.
CPC .......... *H04L 9/0618* (2013.01); *G06F 3/0623* (2013.01); *G06F 3/0647* (2013.01);
(Continued)

(58) Field of Classification Search
CPC ...... G06F 12/1408; G06F 21/53; G06F 21/72; G06F 2212/1052; G06F 2212/402;
(Continued)

(56) References Cited

U.S. PATENT DOCUMENTS 6,125,186 A * 9/2000 Saito ................. H04L 29/06
                                                    380/260
10,291,670 B1 * 5/2019 Grant .................. H04N 21/472
(Continued)

FOREIGN PATENT DOCUMENTS

WO    WO-2016207527 A1 * 12/2016 ............... H04L 9/30

OTHER PUBLICATIONS

Buhren et al., "Fault Attacks on Encrypted General Purpose Compute Platforms", Dec. 2016 arXiv.org, pp. 1-18 (Year: 2016).*

*Primary Examiner* — Khalil Naghdali
(74) *Attorney, Agent, or Firm* — Kacvinsky Daisak Bluni PLLC

(57) ABSTRACT

Various embodiments are generally directed to techniques for converting between different cipher systems, such as, for instance, between a cipher system used for a first encryption environment and a different cipher system used for a second encryption environment, for instance. Some embodiments are particularly directed to an encryption engine that supports memory operations between two or more encryption environments. Each encryption environment can use different cipher systems while the encryption engine can translate ciphertext between the different cipher systems. In various embodiments, for instance, the first encryption environment may include a main memory that uses a position dependent cipher system and the second encrypted environment may include a secondary memory that uses a position independent cipher system.

22 Claims, 9 Drawing Sheets

(51) Int. Cl.
  *G06F 12/14* (2006.01)
  *G06F 21/72* (2013.01)
  *G06F 12/08* (2016.01)
  *G06F 21/60* (2013.01)
  *G06F 3/06* (2006.01)

(52) U.S. Cl.
  CPC ............ *G06F 3/0683* (2013.01); *G06F 12/08* (2013.01); *G06F 12/1408* (2013.01); *G06F 21/53* (2013.01); *G06F 21/602* (2013.01); *G06F 21/72* (2013.01); *H04L 9/06* (2013.01); *G06F 2212/1052* (2013.01); *G06F 2212/402* (2013.01); *G06F 2221/034* (2013.01); *H04L 2209/12* (2013.01)

(58) Field of Classification Search
  CPC ............ G06F 2221/034; G06F 3/0623; G06F 3/0683; G06F 3/0647; H04L 2209/12; H04L 9/06; H04L 9/0618
  USPC .......................................................... 713/193
  See application file for complete search history.

(56) References Cited

U.S. PATENT DOCUMENTS

| | | | |
|---|---|---|---|
| 2006/0112265 A1* | 5/2006 | Huynh | H04L 63/0464 713/153 |
| 2015/0281186 A1* | 10/2015 | Smith | H04L 63/0428 726/27 |
| 2017/0063532 A1* | 3/2017 | Bhattacharyya | H04L 9/0637 |
| 2017/0177862 A1* | 6/2017 | Narendra Trivedi | G06F 3/0604 |
| 2017/0206174 A1* | 7/2017 | Keranen | H04L 9/3226 |

\* cited by examiner

100

200

300

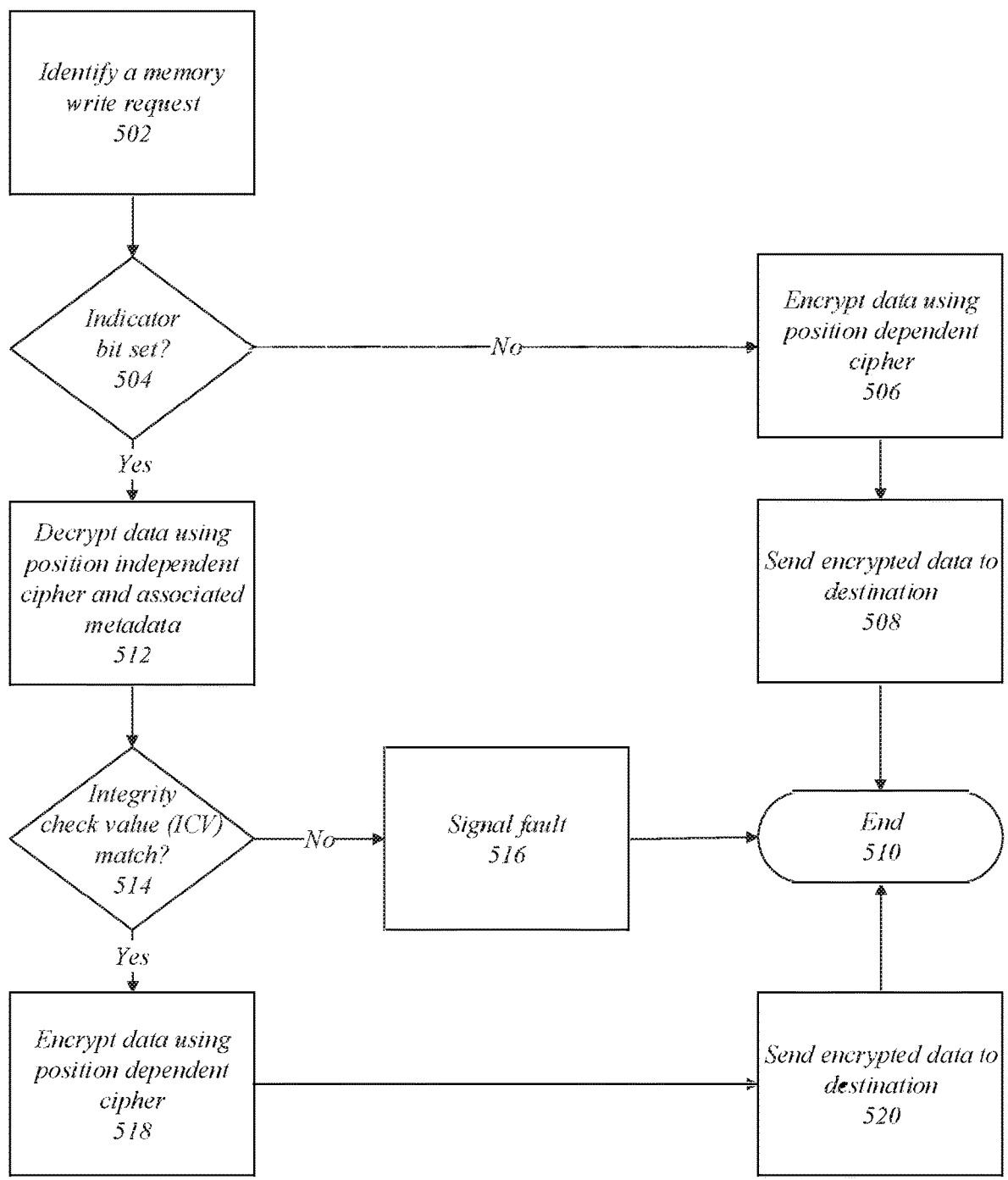

Identify a memory operation request, the memory operation request associated with target information
602

Determine the memory operation requested includes communication of the target information from a first encryption environment to a second encryption environment, the first encryption environment to utilize a first cipher system and the second encryption environment to utilize a second cipher system, the first cipher system different than the second cipher system
604

Translate the target information from the first cipher system to the second cipher system.
606

FIG. 7

Storage Medium 700

Computer Executable Instructions for 400

Computer Executable Instructions for 500

Computer Executable Instructions for 600

… (1) …

TECHNIQUES FOR CIPHER SYSTEM CONVERSION

CROSS-REFERENCE TO RELATED APPLICATIONS

This application is a continuation of, claims the benefit of and priority to previously filed U.S. patent application Ser. No. 15/394,516 filed Dec. 29, 2016, entitled "TECHNIQUES FOR CIPHER SYSTEM CONVERSION", which is hereby incorporated by reference in its entirety.

BACKGROUND

Cryptography may refer to the practice and study of techniques for secure communication in the presence of third parties. More generally, cryptography is about constructing and analyzing protocols that prevent third parties from reading private data. In application, cryptography can involve one or more of encryption and decryption. Encryption can be the process of converting ordinary information, referred to as plaintext, into an unintelligible sequence of symbols, referred to as ciphertext, and decryption can be the processor of converting ciphertext back to plaintext. Typically, a cipher system may include a pair of algorithms that convert data back and forth between plaintext and ciphertext.

BRIEF DESCRIPTION OF THE DRAWINGS

FIG. 5 illustrates an embodiment of a second logic flow.
FIG. 6 illustrates an embodiment of a third logic flow.
FIG. 7 illustrates an embodiment of a storage medium.

DETAILED DESCRIPTION

Figure 1:
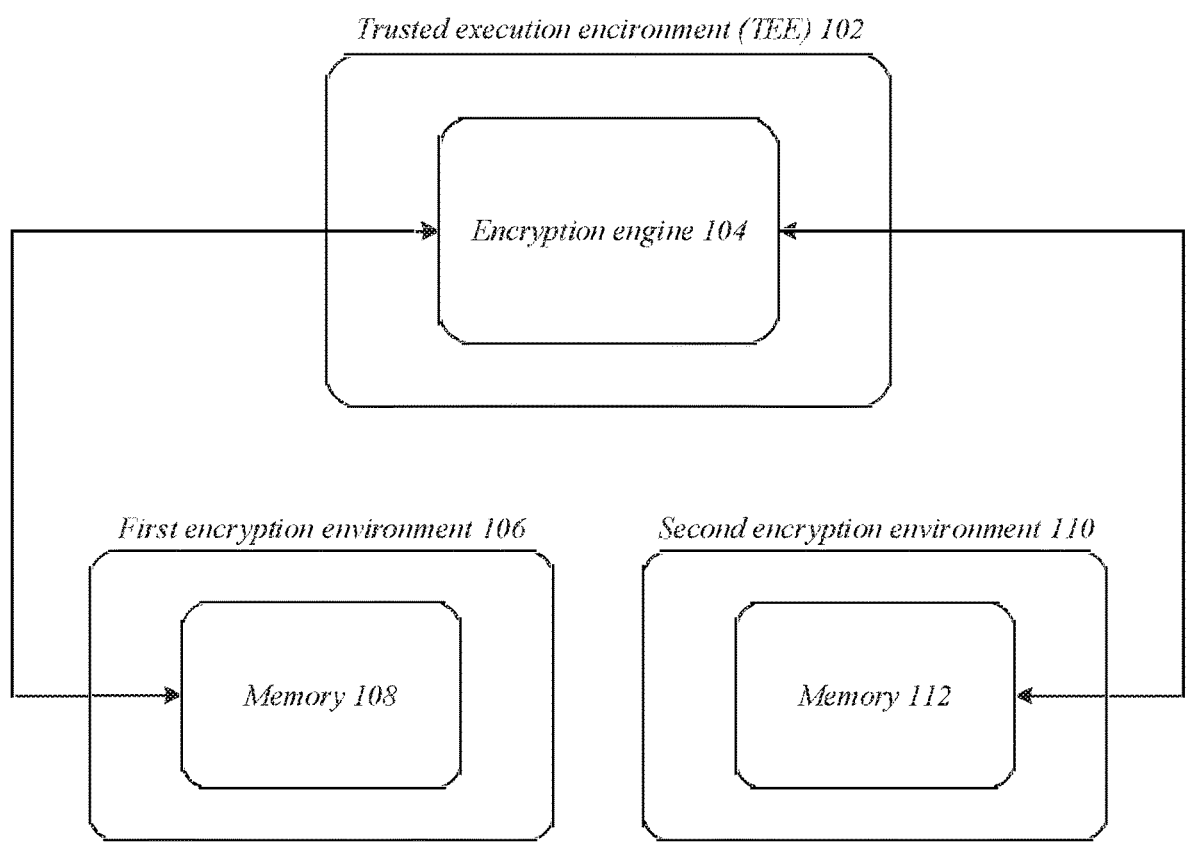
FIG. 1 illustrates an embodiment of a first operating environment.

Various embodiments are generally directed to techniques for converting between different cipher systems, such as, for instance, between a cipher system used for a first encryption environment and a different cipher system used for a second encryption environment, for instance. Some embodiments are particularly directed to an encryption engine that supports memory operations between two or more encryption environments. Each encryption environment can use different cipher systems while the encryption engine can translate ciphertext between the different cipher systems. In various embodiments, for instance, the first encryption environment may include a main memory that uses a position dependent cipher system and the second encrypted environment may include a secondary memory that uses a position independent cipher system. In various such embodiments, the encryption engine may translate between the position dependent cipher system and the position independent cipher system to support memory operations between the first and second encryption environments. In some embodiments, one or more portions of the encryption engine may be implemented in dedicated hardware. In some such embodiments, one or more portions of the translation between different cipher systems may occur with little or no software involvement. These and other embodiments are described and claimed.

Some challenges facing encryption engines include the inability or use of excessively complex, bulky, and inefficient techniques to convert between different encryption environments. These challenges may result from various features of the different encryption environments being translated between and how the translations are implemented. For instance, a position dependent cipher system (e.g., a tweakable block cipher, or the like) may encrypt/decrypt data using a memory address of the data as a tweak and a position independent cipher system may encrypt/decrypt data using a counter value. Further, implementing a translation between different cipher systems in software can require large compute resources. Adding further complexity, memory operations between the different encryption environments may be initiated without notice. For instance, a storage controller may perform a direct memory access (DMA). Absent the ability to identify and translate for memory operations between different encrypted environments, data may be corrupted and/or lost. These and other factors may result in an encryption engine with poor performance and limited efficiency. Such limitations can drastically reduce the capabilities, usability, and applicability of the encryption engine, contributing to ineffective systems with limited capabilities.

Various embodiments described herein include an encryption engine that is able to translate between different encryption environments without software involvement. In some embodiments, the encryption engine may be able to identify a DMA to/from a storage device. In various embodiments, the encryption engine may include hardware to convert between position independent and position dependent cipher systems without any software involvement. In various such embodiments, the state associated with the position independent cipher system may be stored in an integrity and replay protected environment, such as memory within or assigned to a trusted execution environment (TEE). In some instances, the encryption engine can allow more efficient and faster memory operations, such as in paging or virtual machine migration, providing useful applications for both client and server platforms. In these and other ways the encryption engine may enable quick and efficient cipher system translations through hardware implementation to achieve improved memory operations between different encryption environments with increased throughput and higher efficiencies, resulting in several technical effects and advantages.

In one embodiment, for example, an apparatus may comprise a memory within a trusted execution environment (TEE) and logic for an encryption engine, at least a portion of the logic implemented in circuitry coupled to the memory. The logic may identify a memory operation request associated with target information, determine the memory operation request includes communication of the target information from a first encryption environment that utilizes a first cipher system to a second encryption environment that utilizes a second cipher system. The target information may be translated from the first cipher system to the second cipher system.

With general reference to notations and nomenclature used herein, one or more portions of the detailed description which follows may be presented in terms of program procedures executed on a computer or network of computers.

These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an example of an operating environment 100 that may be representative of various embodiments. Operating environment 100 may include encryption engine 104 within trusted execution environment (TEE) 102, memory 108 within first encrypted environment 106, and memory 112 within second encryption environment 110. In operating environment 100, encryption engine 104 may support memory operations between memory 108 and memory 112. For example, encryption engine 104 may identify a memory operation request associated with target information or data and determine the memory operation request includes communication of the target information from memory 108 of the first encryption environment 106 to memory 112 of the second encryption environment 110. The encryption engine 104 may then translate the target information from the cipher system of the first encryption environment to the cipher system of the second encryption environment. In various embodiments encryption engine 104 may include hardware that implements the translation between the different cipher systems, such as a position dependent cipher system and a position independent cipher system. The embodiments are not limited in this context.

In various embodiments, an encryption environment (e.g., encryption environments 106, 110) may include a portion of a computer system utilizes encryption to protect data located in the environment. In some embodiments, data in different encryption environments may be encrypted and decrypted using different techniques. In some such embodiments, the different techniques may adhere to algorithms that require different inputs and generate different outputs. In various embodiments, a trusted execution environment (e.g., TEE 102) may provide a secure environment that can provide a protected platform for secure translations between different encryption environments. For example, code and data loaded within TEE 102 may be protected with respect to confidentiality and integrity. In some embodiments, encrypting and decrypting data may only occur within TEE 102, thereby preventing access to unsecure data.

In some embodiments, encryption engine 104 may identify DMA between memory 108 and memory 112 and, in response, support the movement of information between the memories 108, 112 by converting information between the first and second encrypted environments 106, 110. In various embodiments, the movement of information may be part of one or more of paging or migration operations. For example, when an application or virtual machine pages being migrated can get loaded at different physical addresses on remote machines and encryption engine 104 may support the migration by providing cipher system translations. In some embodiments, the conversion between the first and second encryption environments 106, 110 may occur transparently to software. For example, TEE 102, first encryption environment 106, and second encryption environment 110 may be part of a computer system. In such examples, encryption engine 104 may convert information between the first and second encryption environments 106, 110 while remaining transparent to software of the computer system, such as an operating system (OS) or applications initiating and/or implementing memory operations.

Figure 2:
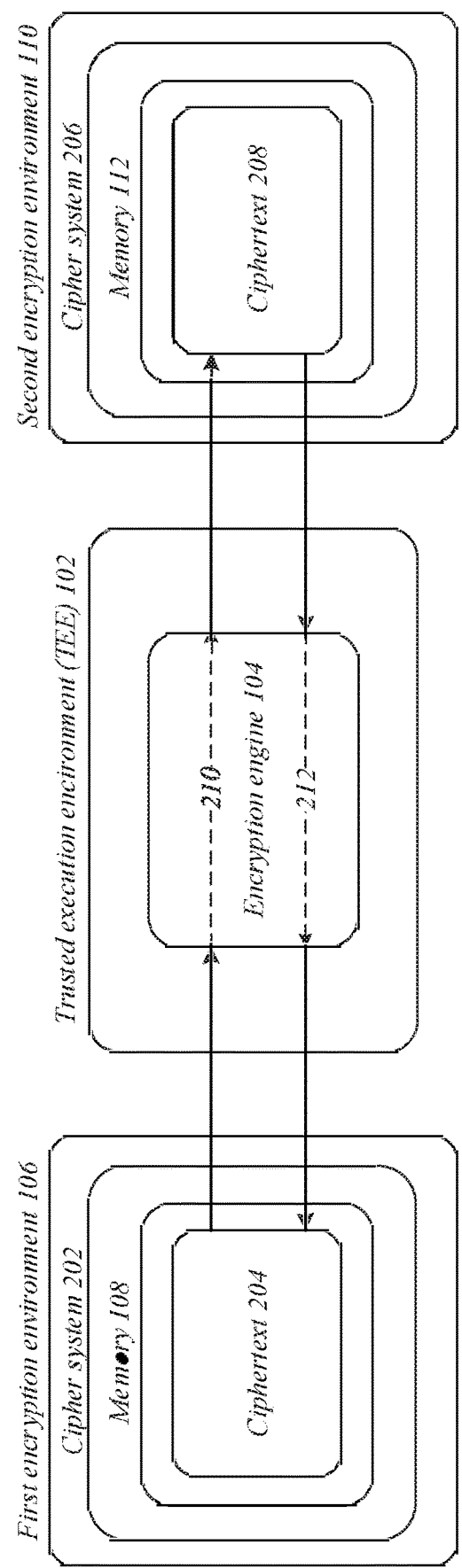
FIG. 2 illustrates an embodiment of a communications flow.

FIG. 2 illustrates an example of a communications flow 200 that may be representative of memory operations between memory 108 of the first encryption environment 106 and memory 112 of the second encryption environment 110. In operating environment 200, encryption engine 104 may translate between cipher system 202 and cipher system 206 to support memory operations between memory 108 of first encryption environment 106 and memory 112 of second encryption environment 110, such as translation 210 and translation 212. In some embodiments, each encryption environment (e.g., encryption environments 106, 110) may adhere to or utilize a cipher system (e.g., cipher systems 202, 206). In some such embodiments, data located within the encryption environment, such as stored in memory 108 or 112 may be encrypted according to the associated cipher system. In various embodiments described herein, encryption engine 104 may translate between ciphertext 204 of cipher system 202 and ciphertext 208 of cipher system 206 utilizing hardware to improve the performance of memory operations associated with paging and/or migration. The embodiments are not limited in this context.

In various embodiments, encryption engine 104 may perform translation 210 and/or translation 212. In some embodiments, one or more translations may be performed in parallel. In some such embodiments, multiple encryption engines may be used. For example, multiple memory paths may communicatively couple TEE 102 with one or more of first and second encryption environments 106, 110 and a separate encryption engine may be utilized for each memory path. In various embodiments multiple encryption engines may share one or more portions of hardware dedicated to their implementation.

In some embodiments, translation 210 may include the encryption engine 104 receiving ciphertext 204 from memory 108 of the first encryption environment 106, converting it from cipher system 202 to cipher system 206 to generate ciphertext 208, and passing ciphertext 208 to memory 112 of the second encryption environment 110 for storage. In various embodiments, cipher system 202 may include a position dependent cipher system (e.g., XEX-based tweaked-codebook mode with ciphertext stealing (XTS)). In some embodiments, cipher system 206 may include a position independent cipher system (e.g., Advanced Encryption Standard Galois/Counter Mode (AES-GCM)). In various embodiments, one or more portions of translation 210 may be implemented in dedicated hardware. In some embodiments, translation 210 may be in support of a memory read operation moving data from memory 108 to memory 112. This and other aspects of translation 210 will be described in more detail below, such as with respect to FIGS. 3 and 5.

In various embodiments, translation 212 may include the encryption engine 104 receiving ciphertext 208 from memory 112 of the second encryption environment 110, converting it from cipher system 206 to cipher system 202 to generate ciphertext 204, and passing ciphertext 204 to memory 108 of the first encryption environment 1106. In some embodiments, one or more portions of translation 212 may be implemented in dedicated hardware. In various embodiments one or more portions of translation 210 and 212 may utilize the same dedicated hardware. In some embodiments, translation 210 may be in support of a memory write operation moving data from memory 112 to memory 108. This and other aspects of translation 212 will be described in more detail below, such as with respect to FIGS. 3 and 4.

Figure 3:
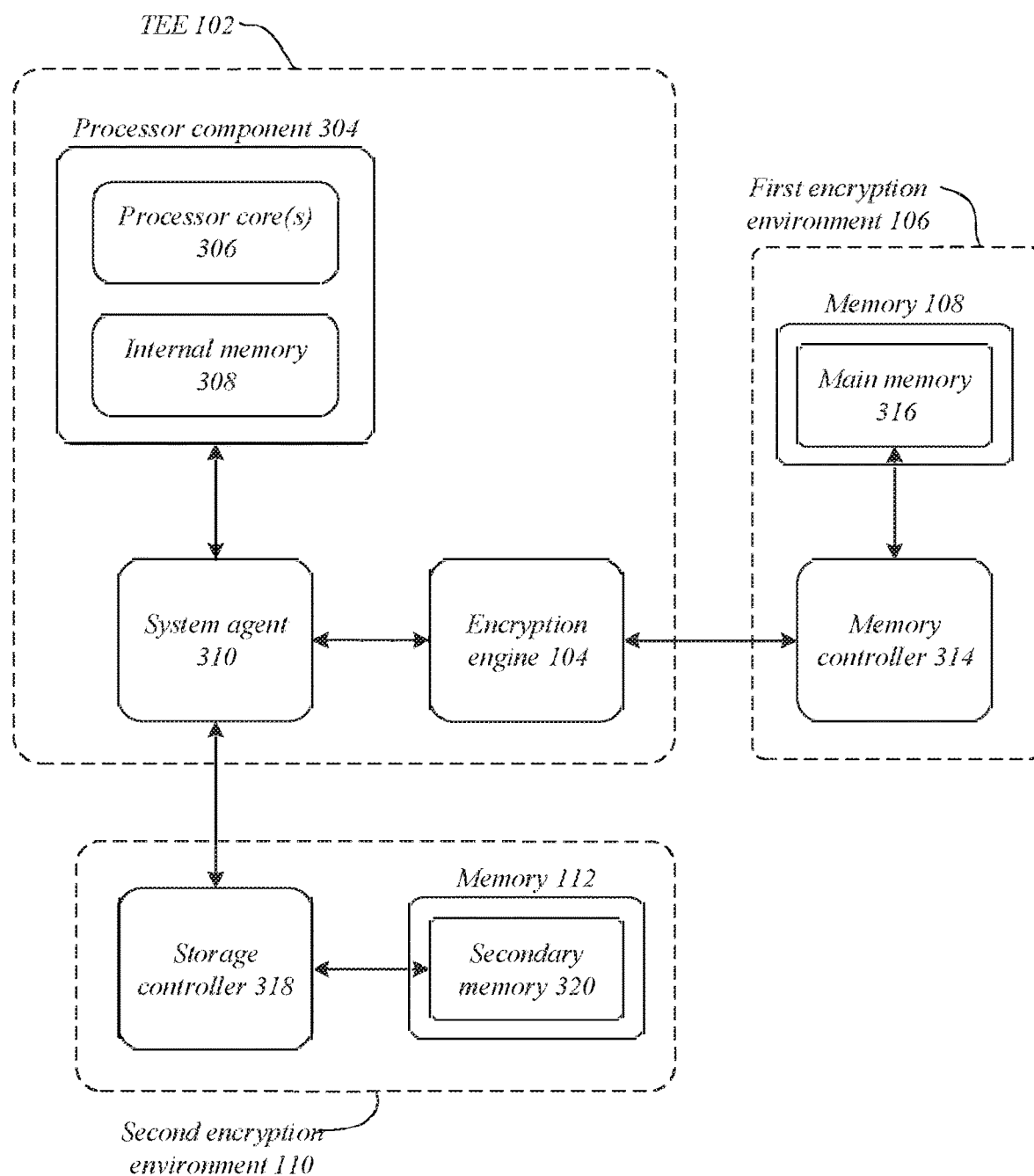
FIG. 3 illustrates an embodiment of a second operating environment.

FIG. 3 illustrates an example of an operating environment 300 that may be representative of various embodiments. In operation environment 300, encryption engine 104 may support memory operations between main memory 316 and secondary memory 320. For example, main memory 316 may include random access memory (RAM) and secondary memory 320 may include disk memory. In the illustrated embodiment, TEE 102 may include processor component 304 and system agent 310 in addition to encryption engine 104, first encryption environment 110 may include memory controller 314 and memory 108 comprising main memory 316, and second encryption environment 110 may include storage controller 318 and memory 112 comprising secondary memory 320. In some embodiments, encryption engine 104 may support memory operations, such as a DMA, between main memory 316 and secondary memory 320 by translating between different cipher systems utilized by the first and second encryption environments 106, 110. In various embodiments described herein encryption engine 104 may include one or more dedicated hardware components to perform one or more portions of translations between different cipher systems. In various such embodiments, the translations may occur transparently to one or more pieces of software that initiate or manage memory operations. The embodiments are not limited in this context.

In various embodiments, operating environment 300 may include one or more portions of a computer system that performs dynamic memory allocation between main memory 316 and secondary memory 320. For instance, storage controller 318 may implement a dynamic memory allocation strategy, such as paging, that attempts to keep the most relevant data resident in main memory 316 while keeping less relevant data in secondary memory 320. To realize the dynamic memory allocation strategy data must be able to freely move between main memory 316 and secondary memory 320. In various embodiments described herein encryption engine 104 may support or enable the free flow of data between main memory 316 and secondary memory 320. In some embodiments, storage controller 318 may implement the dynamic memory allocation strategy using direct memory accesses (DMAs) to read from and write to main memory 316.

To support memory operations, such as DMAs, between first and second encryption environments 106, 110, encryption engine 104 may need to identify or receive indication of the memory operations between main memory 316 and secondary memory 320 that require translations between different cipher systems. In some embodiments, an OS may assist in identifying memory operations requiring translation. For example, on assigning pages to a page swapping software to move to/from secondary memory 320, the OS may use a physical address to indicate a page belonging to the page swapping software that will be swapped in/out to/from main memory 316. This bit may be referred to as a DMA storage bit and by being part of the physical address can be carried on the memory interface naturally.

In other embodiments, identifying memory operations between main memory 316 and secondary memory 320 that require translations between different cipher systems may utilize a controller-specific method of signaling such memory operations. For instance, moving pages to/from secondary memory 320 may be achieved by programming storage controller 318 to DMA data from/to main memory 316. In some embodiments, on paging out a page from main memory 316 to secondary memory 320, storage controller 318 may issue read requests to main memory 316. Similarly, on paging in a page, storage controller 318 may read the page from secondary memory 320 and write the page to main memory 316. In embodiments that utilize storage controller 318 to DMA main memory 316, storage controller 318 may send a bit to indicate a DMA. In such embodiments, the bit may only be asserted by storage controller 318 and all other controllers may be unaware of this bit and leave it clear. In various embodiments, encryption engine may determine to translate target information from a first cipher system to a second cipher system based on this bit. In some embodiments, one or more protocols (e.g., a memory protocol or an on-chip system fabric protocol) may be modified to carry this bit along with any other request attributes.

In some embodiments, page-granular encryption may be enabled. In some such embodiments, an OS may determine which pages are to be protected with encryption in one or more memories, such as memory 108 or 112. In various embodiments, this may utilize an additional bit of the physical address space, one or indicate whether a page needs to be protected and the other to indicate DMA to/from a storage device. In some embodiments, one or more indicator bits may be carried as an additional bit on interfaces to prevent reducing the physical address space available.

In some embodiments, processor component 304 and system agent 310 may be included in TEE 102 and provide various resources and/or functionality to encryption engine 104. Processor component 304 may include one or more processor core(s) 306 and internal memory 308. In various embodiments, internal memory 308 may refer to cache memory or on-chip memory. For example, processor component 304 may comprise a processing chip or a controller.

In some embodiments, internal memory 308 may store one or more instructions to implement system agent 310 and/or one or more portions of encryption engine 104. In various embodiments, processor component 304 may implement or realize TEE 104 by only executing instructions stored in internal memory 308. In some embodiments, one or more portions of internal memory 308 may be allocated to encryption engine 104. In some such embodiments, encryption engine 104 may utilize internal memory 308 to provide integrity and/or replay protection to data in one or more of the first and second encryption environments 106, 110. In various embodiments, one or more portions of main memory 316 and/or secondary memory 320 may be allocated to TEE 102 and/or encryption engine 104.

Figure 4:
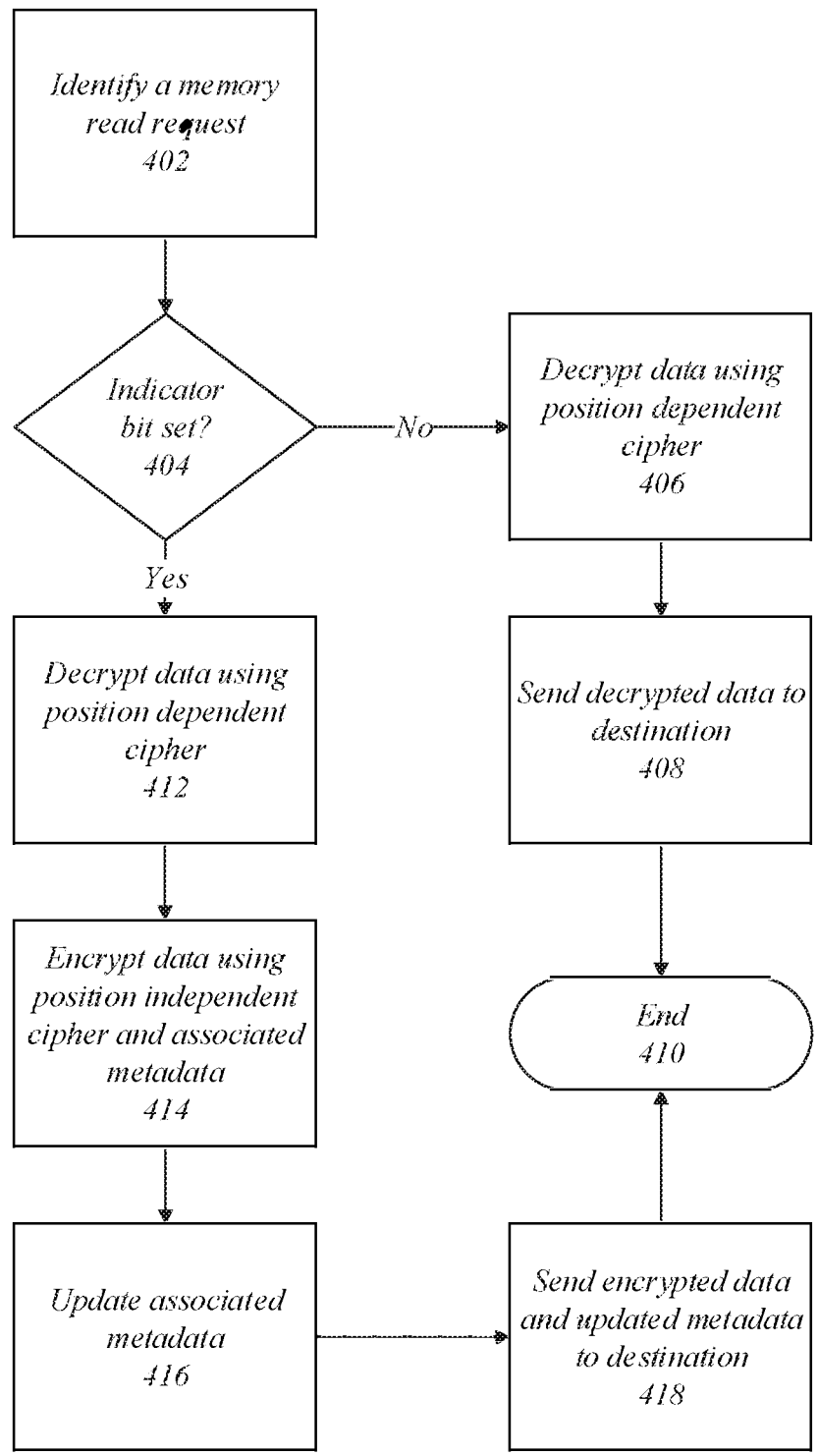
FIG. 4 illustrates an embodiment of a first logic flow.

FIG. 4 illustrates one embodiment of a logic flow 400, which may be representative of operations that may be executed in various embodiments in conjunctions with translating between one or more cipher systems. The logic flow 400 may be representative of some or all of the operations that may be executed by one or more components of operating environments 100, 200, 300 of FIGS. 1-3, such as encryption engine 104. The embodiments are not limited in this context.

In the illustrated embodiment shown in FIG. 4, the logic flow 400 may begin at block 402. At block 402 "identify a memory read request" a memory read request may be identified. For example, encryption engine 104 may identify a memory request received from processor component 304 or storage controller 318. In some embodiments, encryption engine 104 may monitor a memory path between TEE 102 and one or more encrypted environments, such as first and second encrypted environments 106, 110.

Continuing to block 404 "indicator bit set?", it may be determined if an indicator bit is set. In various embodiments, encryption engine 104 may inspect an indicator bit included in a memory operation request. In various such embodiments, storage controller 318 may set the bit when requesting a read operation, such as via a DMA, to indicate the need for translation between different cipher systems. For example, the indicator bit may include a bit in the physical address, which may be set by the OS for only pages moved by the page swapping software between main memory 316 and secondary memory 320. In another example, storage controller 318 may assert the bit with transactions to indicate DMA between first and second encryption environments 106, 110.

In some embodiments, the indicator bit is carried on the memory interface with each request to/from memory (e.g., memory 108, 112) and is used by encryption engine 104 to identify a request needing protection. In some such embodiments, for a read from memory, the bit may indicate to encryption engine 104 that the memory block was stored in encrypted memory. For instance, in response to identifying a protected read, encryption engine 104 may fetch the target information (i.e., memory object, e.g., data line, page, block as ciphertext 210) from memory 108, decrypt it using position dependent cipher and re-encrypt it using a position independent cipher to allow the target information to be stored in memory 112 (e.g., as ciphertext 208) and later paged in (e.g., converted back to ciphertext 210). In various embodiments, this may occur without software involvement in the cipher system conversion.

Referring back to block 404, if the indicator bit is not set, then logic flow 400 may proceed to block 406 "decrypt data using position dependent cipher". For example, encryption engine 104 may determine processor component 304 issued the read request and needs ciphertext 204 to be converted to plaintext for storage in internal memory 308 for analysis and/or manipulation via one or more of processor core(s) 306. In some embodiments this may be referred to as a regular memory operation or access to memory. In various embodiments, decryption of data using a position dependent cipher may include encryption engine 104 decrypting a data line in main memory 316 using the address of the data line as the tweak for the position dependent cipher. Continuing to block 408 "send decrypted data to destination" the data decrypted using the position dependent cipher may be conveyed to its destination. For example, encryption engine may decrypt ciphertext 204 and send it to internal memory 308 for storage. Logic flow 400 may then end at block 410.

Referring again to block 404, if the indicator bit is set, the logic flow 400 may proceed to block 412 "decrypt data using position dependent cipher" For example, encryption engine 104 may determine storage controller 318 has request target information in main memory 316 be paged out for storage in secondary memory 320. Continuing to block 414 "encrypt data using position independent cipher and associated metadata", the decrypted data may be re-encrypted according to a second cipher system. For example, plaintext generated from the decryption in block 412 may be encrypted using a position independent cipher that utilizes metadata that includes a counter value and/or an integrity check value (ICV). In some embodiment, one or more of the ICV or the counter value may enable data integrity and/or replay protection.

At block 416 "update associated metadata", the metadata associated with the encryption by the position independent cipher may be updated. For example, one or more of a counter value, ICV, or any related data may be updated, such as by incrementing the counter value. In some embodiments, the address used by the position dependent cipher may be added to the associated metadata when it is updated. Proceeding to block 418 "send encrypted data and updated metadata to destination" the encrypted data and the updated metadata may be sent to the read requestor. For example, a data line encrypted with a position independent cipher (e.g., per cipher system 206) may be stored along with any associated metadata to memory 112.

In the case of a read operation comprising a page out, in various embodiments, the decryption of the line using position dependent cipher and re-encryption using position independent cipher can be saved by storing additional metadata with the page. For instance, the physical address of the page may be stored along with the page as metadata. In such instances, on page in, the physical address used for position dependent cipher stored with the page may be used to decrypt the page using position dependent cipher and then re-encrypt with position dependent cipher using the new physical address to which the page is being stored to. In other such instances, the physical address stored in the metadata may be used to store the page back into the original physical address, eliminating the need for any cryptographic operations. For example, ciphertext 204 may be stored in memory 112 along with metadata that indicates the physical address of the location ciphertext 204 was stored in memory 108.

Further, in various embodiments, metadata may be stored that enables a page being re-loaded to be verified for correctness/freshness (e.g., integrity and/or replay protection). In some embodiments, a region may be reserved in memory 108 to store and protect the metadata. In some such embodiments, the region may be referred to as or include a page root directory. In various embodiments, this may include one or more portions of main memory 316 assigned to or associated with encryption engine 104. In some embodiments, this metadata may include one or more of the physical address from which a page was paged out, a counter value, an ICV, or any other associated data. Logic flow 400 may then end at block 410. In various embodiments, a Merkle tree of message authentication codes (MACs) may be used to integrity and replay protect the page root directory. In various such embodiments, on page out, the tree maybe updated, and on page in, the tree may be walked to determine correctness of the loaded data.

FIG. 5 illustrates one embodiment of a logic flow 500, which may be representative of operations that may be executed in various embodiments in conjunctions with translating between one or more cipher systems. The logic flow 500 may be representative of some or all of the operations that may be executed by one or more components of operating environments 100, 200, 300 of FIGS. 1-3, such as encryption engine 104. The embodiments are not limited in this context.

In the illustrated embodiment shown in FIG. 5, the logic flow 500 may begin at block 502. At block 502 "identify a memory write request" a memory write request may be identified. For example, encryption engine 104 may identify a memory request received from processor component 304 or storage controller 318. In some embodiments, encryption engine 104 may monitor a memory path between TEE 102 and one or more encrypted environments, such as first and second encrypted environments 106, 110.

Continuing to block 504 "indicator bit set?", it may be determined if an indicator bit is set. In various embodiments, encryption engine 104 may inspect an indicator bit included in a memory operation request. In various such embodiments, storage controller 318 may set the bit when requesting a read operation or a write operation, such as via a DMA, to indicate the need for translation between different cipher systems. For example, the indicator bit may include a bit in the physical address, which may be set by the OS for only pages moved by the page swapping software between main memory 316 and secondary memory 320. In another example, storage controller 318 may assert the bit with transactions to indicate DMA between first and second encryption environments 106, 110.

In some embodiments, the indicator bit is carried on the memory interface with each request to/from memory (e.g., memory 108, 112) and is used by encryption engine 104 to identify a request needing protection. In some such embodiments, for a write to memory, the bit may indicate to encryption engine 104 that the memory block was stored in encrypted memory. For instance, in response to identifying a protected write, encryption engine 104 may receive target information (i.e., memory object, e.g., data line, page, block as ciphertext 208) from memory 112, decrypt it using position independent cipher and re-encrypt it using a position dependent cipher to allow the target information to be stored in memory 108 (e.g., as ciphertext 210) and later paged out (e.g., converted back to ciphertext 208). In various embodiments, this may occur without software involvement in the cipher system conversion.

Referring back to block 504, if the indicator bit is not set, then logic flow 500 may proceed to block 506 "encrypt data using position dependent cipher" the data associated with the memory write request identified in block 502 may be encrypted using a position dependent cipher. For example, encryption engine 104 may determine processor component 304 issued the write request and needs plaintext stored in internal memory 308 to be encrypted for storage in main memory 316. In some embodiments, this may be referred to as a regular memory operation or access to memory. In various embodiments, encryption of data using a position dependent cipher may include encryption engine 104 encrypting data for storage in main memory 316 using the address of the storage as the tweak for the position dependent cipher. Continuing to block 508 "send encrypted data to destination" the data encrypted using the position dependent cipher may be conveyed to its destination. For example, encryption engine 104 may encrypt ciphertext 204 and send it to main memory 316 for storage. Logic flow 500 may then end at block 510.

Referring again to block 504, if the indicator bit is set, the logic flow 500 may proceed to block 512 "decrypt data using position independent cipher and associated metadata". For example, encryption engine 104 may determine storage controller 318 has requested target information in secondary memory 320 be paged in for storage in main memory 316. Continuing to block 514 "integrity check value (ICV) match?", it may be determined if an associated ICV matches. If the ICV does not match, a fault is signaled at block 516 "signal fault". For example, the fault may indicate potentially malicious behavior. Logic flow 500 may then end at block 510.

Referring back to block 514, if the ICV does match, the logic flow 500 may proceed to block 518 "encrypt data using position dependent cipher". In various embodiments block 518 may proceed the same as or similar to block 506. Continuing to block 520 "send encrypted data to destination" the encrypted data may be sent to the target of the write request. For example, a data line encrypted with a position dependent cipher (e.g., per cipher system 206) may be stored to memory 108. Logic flow 500 may then end at block 510.

FIG. 6 illustrates one embodiment of a logic flow 600, which may be representative of operations that may be executed in various embodiments in conjunctions with translating between one or more cipher systems. The logic flow 600 may be representative of some or all of the operations that may be executed by one or more components of operating environments 100, 200, 300 of FIGS. 1-3, such as encryption engine 104. The embodiments are not limited in this context.

In the illustrated embodiment shown in FIG. 6, the logic flow 600 may begin at block 602. At block 602 "identify a memory operation request, the memory operation request associated with target information" a memory operation request that is associated with target information may be identified. For example, encryption engine 104 may identify the memory operation request. In some embodiments, the memory operation request may be part of a DMA from storage controller 318.

Proceeding to block 604 "determine the memory operation request includes communication of the target information from a first encryption environment to a second encryption environment, the first encryption environment to utilize a first cipher system and the second encryption environment to utilize a second cipher system, the first cipher system different than the second cipher system" it may be determined that the memory operation request includes communication of the target information from a first encryption environment that utilizes a first cipher system to a second encryption environment that utilizes a second cipher system. For example, the target information may be communicated between cipher system 202 of first encryption environment 106 and cipher system 206 of second encryption environment 110. In some embodiments, the memory operation request may include an indicator bit that encryption engine 104 basis its determination on.

At block 606 "translate the target information from the first cipher system to the second cipher system", the target information may be converted from the first cipher system to the second cipher system. For example, encryption engine 104 may translate ciphertext 204 to ciphertext 208. In some embodiments, one or more portions of the translation between different cipher systems may be performed by dedicated hardware.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to communication flow 200 of FIG. 2 and logic flows 400, 500, and 600 of FIGS. 4-6. Examples of a computer-readable storage medium or machine-readable storage medium may include any tangible media capable of storing electronic data, including volatile memory or non-volatile memory, removable or non-removable memory, erasable or non-erasable memory, writeable or rewriteable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
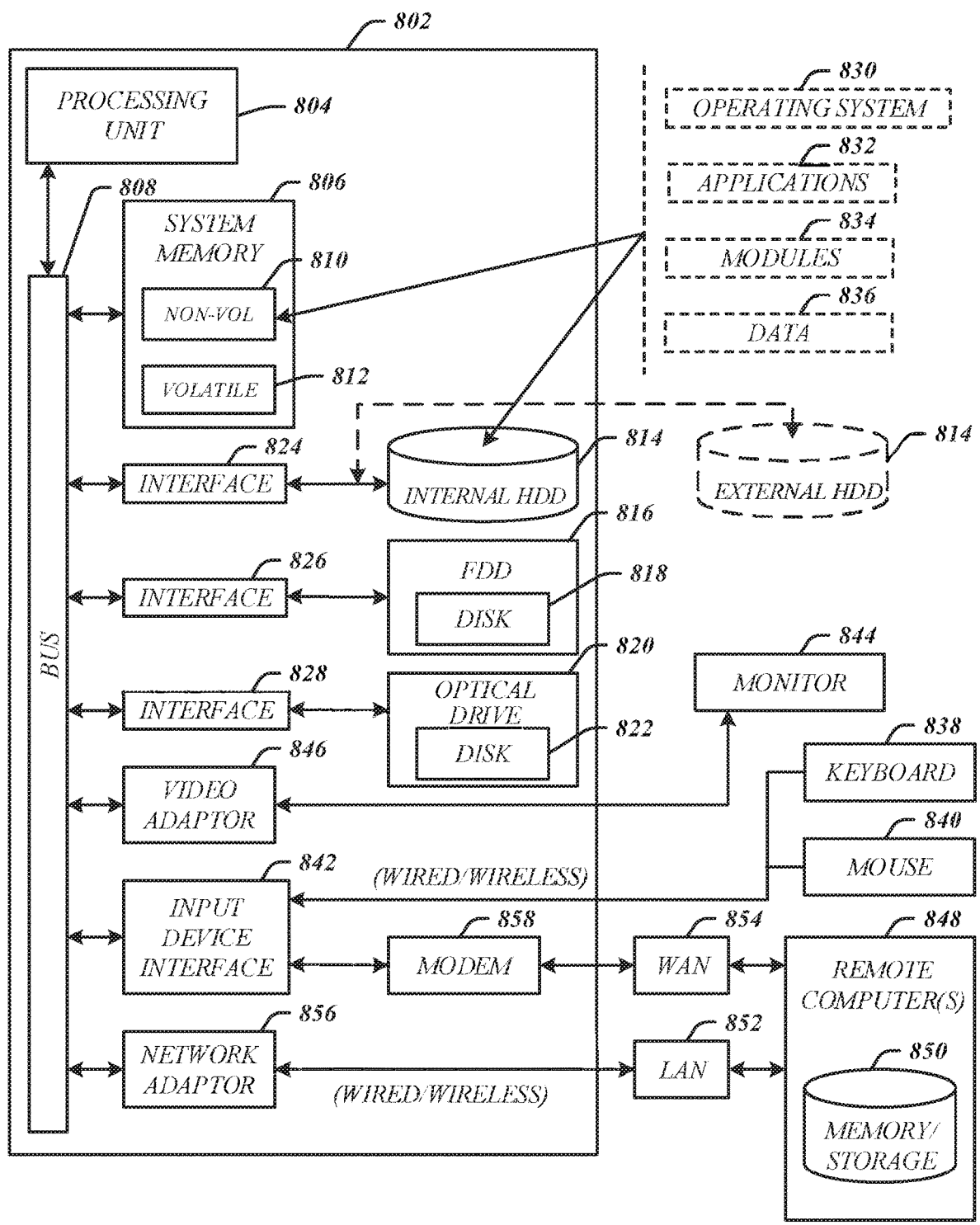
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of operating environment 100 of FIG. 1 and/or operation environment 300 of FIG. 3. In some embodiments, computing architecture 800 may be representative, for example, one or more portions of encryption engine 104 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the TEE 102, such as one or more portions of translation engine 104.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 1354, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
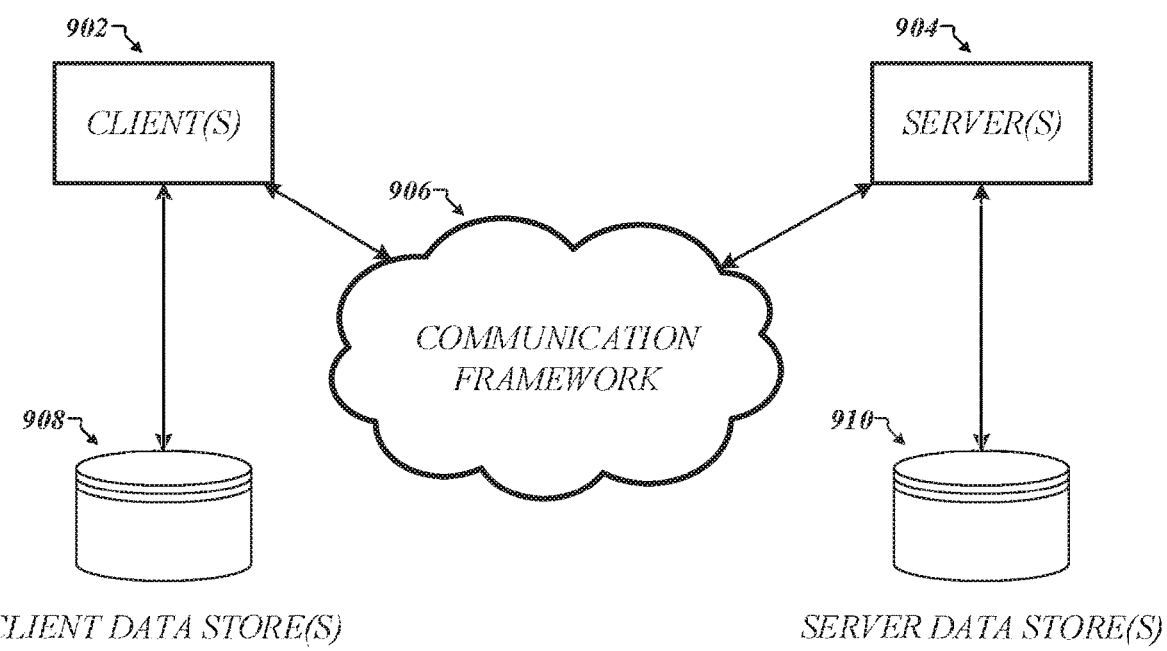
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus for cipher system conversion, the apparatus comprising: a memory within a trusted execution environment (TEE); and logic for an encryption engine, at least a portion of the logic implemented in circuitry coupled to the memory, the logic to: identify a memory operation request, the memory operation request associated with target information; determine the memory operation request includes communication of the target information from a first encryption environment to a second encryption environment, the first encryption environment to utilize a first cipher system and the second encryption environment to utilize a second cipher system, the first cipher system different than the second cipher system; and translate the target information from the first cipher system to the second cipher system.

Example 2 includes the subject matter of Example 1, the first encryption environment comprising a main memory and the second encryption environment comprising a secondary memory.

Example 3 includes the subject matter of Example 1, the logic to receive the memory operation request from the first encryption environment and send the target information translated from the first cipher system to the second cipher system to the second encryption environment.

Example 4 includes the subject matter of Example 1, the logic to receive the memory operation request from the second encryption environment and send the target information translated from the first cipher system to the second cipher system to the second encryption environment.

Example 5 includes the subject matter of Example 1, the logic to fetch the target information from the first encryption environment.

Example 6 includes the subject matter of Example 1, the target information comprising first ciphertext encrypted based on the first cipher system and the target information translated from the first cipher system to the second cipher system comprising second ciphertext encrypted based on the second cipher system.

Example 7 includes the subject matter of Example 6, the logic to decrypt the first ciphertext to produce plaintext and encrypt the plaintext to produce the second ciphertext to translate the target information from the first cipher system to the second cipher system.

Example 8 includes the subject matter of Example 1, at least a portion of the translation of the target information from the first cipher system to the second cipher system implemented in dedicated hardware.

Example 9 includes the subject matter of Example 1, the first and second cipher systems each comprising an encryption cipher and a decryption cipher.

Example 10 includes the subject matter of Example 1, the first cipher system comprising a tweakable cipher system and the second cipher system comprising a counter mode cipher system.

Example 11 includes the subject matter of Example 10, the tweakable cipher system to encrypt data based on a physical address of the data.

Example 12 includes the subject matter of Example 1, the first cipher system comprising a position dependent cipher system and the second cipher system comprising a position independent cipher system.

Example 13 includes the subject matter of Example 1, the memory operation request to include a read request of the target information.

Example 14 includes the subject matter of Example 13, the target information comprising a memory page stored in the first encryption environment and the read request comprising a paging-out operation.

Example 15 includes the subject matter of Example 1, the memory operation request to include a write request of the target information.

Example 16 includes the subject matter of Example 15, the target information comprising a memory page stored in the first encryption environment and the write request comprising a paging-in operation.

Example 17 includes the subject matter of Example 1, the logic to determine the memory operation request includes communication of the target data from the first encryption environment to the second encryption environment based on a bit asserted by a storage controller.

Example 18 includes the subject matter of Example 1, the logic to determine the memory operation request includes communication of the target data from the first encryption environment to the second encryption environment based on one or more address bits in the memory operation request.

Example 19 includes the subject matter of Example 1, the TEE comprising the encryption engine.

Example 20 is a system, comprising: an apparatus according to any of claims 1 to 19; and at least one network interface card (NIC).

Example 21 includes the subject matter of Example 20, the at least one NIC communicatively coupled with a network.

Example 22 includes the subject matter of Example 21, the at least one NIC communicatively coupled to a virtual machine (VM) via the network.

Example 23 is at least one non-transitory computer-readable medium comprising a set of instructions that, in response to being executed at an encryption device, cause the encryption device to: identify a memory operation request, the memory operation request associated with target information; determine the memory operation request includes communication of the target information from a first encryption environment to a second encryption environment, the first encryption environment to utilize a first cipher system and the second encryption environment to utilize a second cipher system, the first cipher system different than the second cipher system; and translate, with an encryption engine, the target information from the first cipher system to the second cipher system within a trusted execution environment (TEE).

Example 24 includes the subject matter of Example 23, the first encryption environment comprising a main memory and the second encryption environment comprising a secondary memory.

Example 25 includes the subject matter of Example 23, comprising instructions that, in response to being executed at the encryption device, cause the encryption device to receive the memory operation request from the first encryption environment and send the target information translated from the first cipher system to the second cipher system to the second encryption environment.

Example 26 includes the subject matter of Example 23, comprising instructions that, in response to being executed at the encryption device, cause the encryption device to receive the memory operation request from the second encryption environment and send the target information translated from the first cipher system to the second cipher system to the second encryption environment.

Example 27 includes the subject matter of Example 23, comprising instructions that, in response to being executed at the encryption device, cause the encryption device to fetch the target information from the first encryption environment.

Example 28 includes the subject matter of Example 23, the target information comprising first ciphertext encrypted based on the first cipher system and the target information translated from the first cipher system to the second cipher system comprising second ciphertext encrypted based on the second cipher system.

Example 29 includes the subject matter of Example 28, comprising instructions that, in response to being executed at the encryption device, cause the encryption device to decrypt the first ciphertext to produce plaintext and encrypt the plaintext to produce the second ciphertext to translate the target information from the first cipher system to the second cipher system.

Example 30 includes the subject matter of Example 23, at least a portion of the translation of the target information from the first cipher system to the second cipher system implemented in dedicated hardware.

Example 31 includes the subject matter of Example 23, the first and second cipher systems each comprising an encryption cipher and a decryption cipher.

Example 32 includes the subject matter of Example 23, the first cipher system comprising a tweakable cipher system and the second cipher system comprising a counter mode cipher system.

Example 33 includes the subject matter of Example 32, the tweakable cipher system to encrypt data based on a physical address of the data.

Example 34 includes the subject matter of Example 23, the first cipher system comprising a position dependent cipher system and the second cipher system comprising a position independent cipher system.

Example 35 includes the subject matter of Example 23, the memory operation request to include a read request of the target information.

Example 36 includes the subject matter of Example 35, the target information comprising a memory page stored in the first encryption environment and the read request comprising a paging-out operation.

Example 37 includes the subject matter of Example 23, the memory operation request to include a write request of the target information.

Example 38 includes the subject matter of Example 37, the target information comprising a memory page stored in the first encryption environment and the write request comprising a paging-in operation.

Example 39 includes the subject matter of Example 23, comprising instructions that, in response to being executed at the encryption device, cause the encryption device to determine the memory operation request includes communication of the target data from the first encryption environment to the second encryption environment based on a bit asserted by a storage controller.

Example 40 includes the subject matter of Example 23, comprising instructions that, in response to being executed at the encryption device, cause the encryption device to determine the memory operation request includes communication of the target data from the first encryption environment to the second encryption environment based on one or more address bits in the memory operation request.

Example 41 includes the subject matter of Example 23, the TEE comprising the encryption engine.

Example 42 is a method for cipher system conversion, the method comprising: identifying a memory operation request, the memory operation request associated with target information; determining the memory operation request includes communication of the target information from a first encryption environment to a second encryption environment, the first encryption environment to utilize a first cipher system and the second encryption environment to utilize a second cipher system, the first cipher system different than the second cipher system; and translating, with an encryption engine, the target information from the first cipher system to the second cipher system within a trusted execution environment (TEE).

Example 43 includes the subject matter of Example 42, the first encryption environment comprising a main memory and the second encryption environment comprising a secondary memory.

Example 44 includes the subject matter of Example 42, comprising receiving the memory operation request from the first encryption environment and sending the target information translated from the first cipher system to the second cipher system to the second encryption environment.

Example 45 includes the subject matter of Example 42, comprising receiving the memory operation request from the second encryption environment and sending the target information translated from the first cipher system to the second cipher system to the second encryption environment.

Example 46 includes the subject matter of Example 42, comprising fetching the target information from the first encryption environment.

Example 47 includes the subject matter of Example 42, the target information comprising first ciphertext encrypted based on the first cipher system and the target information translated from the first cipher system to the second cipher system comprising second ciphertext encrypted based on the second cipher system.

Example 48 includes the subject matter of Example 47, comprising decrypting the first ciphertext to produce plaintext and encrypting the plaintext to produce the second ciphertext to translate the target information from the first cipher system to the second cipher system.

Example 49 includes the subject matter of Example 42, at least a portion of the translation of the target information from the first cipher system to the second cipher system implemented in dedicated hardware.

Example 50 includes the subject matter of Example 42, the first and second cipher systems each comprising an encryption cipher and a decryption cipher.

Example 51 includes the subject matter of Example 42, the first cipher system comprising a tweakable cipher system and the second cipher system comprising a counter mode cipher system.

Example 52 includes the subject matter of Example 51, the tweakable cipher system to encrypt data based on a physical address of the data.

Example 53 includes the subject matter of Example 42, the first cipher system comprising a position dependent cipher system and the second cipher system comprising a position independent cipher system.

Example 54 includes the subject matter of Example 42, the memory operation request including a read request of the target information.

Example 55 includes the subject matter of Example 54, the target information comprising a memory page stored in the first encryption environment and the read request comprising a paging-out operation.

Example 56 includes the subject matter of Example 42, the memory operation request including a write request of the target information.

Example 57 includes the subject matter of Example 56, the target information comprising a memory page stored in the first encryption environment and the write request comprising a paging-in operation.

Example 58 includes the subject matter of Example 42, comprising determining the memory operation request includes communication of the target data from the first encryption environment to the second encryption environment based on a bit asserted by a storage controller.

Example 59 includes the subject matter of Example 42, comprising determining the memory operation request includes communication of the target data from the first encryption environment to the second encryption environment based on one or more address bits in the memory operation request.

Example 60 includes the subject matter of Example 42, the TEE comprising the encryption engine.

Example 61 is an apparatus for cipher system conversion, the apparatus comprising: means for identifying a memory operation request, the memory operation request associated with target information; means for determining the memory operation request includes communication of the target information from a first encryption environment to a second encryption environment, the first encryption environment to utilize a first cipher system and the second encryption environment to utilize a second cipher system, the first cipher system different than the second cipher system; and means for translating, with an encryption engine, the target information from the first cipher system to the second cipher system within a trusted execution environment (TEE).

Example 62 includes the subject matter of Example 61, the first encryption environment comprising a main memory and the second encryption environment comprising a secondary memory.

Example 63 includes the subject matter of Example 61, comprising means for receiving the memory operation request from the first encryption environment and sending the target information translated from the first cipher system to the second cipher system to the second encryption environment.

Example 64 includes the subject matter of Example 61, comprising means for receiving the memory operation request from the second encryption environment and sending the target information translated from the first cipher system to the second cipher system to the second encryption environment.

Example 65 includes the subject matter of Example 61, comprising means for fetching the target information from the first encryption environment.

Example 66 includes the subject matter of Example 61, the target information comprising first ciphertext encrypted based on the first cipher system and the target information translated from the first cipher system to the second cipher system comprising second ciphertext encrypted based on the second cipher system.

Example 67 includes the subject matter of Example 66, comprising means for decrypting the first ciphertext to produce plaintext and means for encrypting the plaintext to produce the second ciphertext to translate the target information from the first cipher system to the second cipher system.

Example 68 includes the subject matter of Example 61, at least a portion of the translation of the target information from the first cipher system to the second cipher system implemented in dedicated hardware.

Example 69 includes the subject matter of Example 61, the first and second cipher systems each comprising an encryption cipher and a decryption cipher.

Example 70 includes the subject matter of Example 61, the first cipher system comprising a tweakable cipher system and the second cipher system comprising a counter mode cipher system.

Example 71 includes the subject matter of Example 70, the tweakable cipher system to encrypt data based on a physical address of the data.

Example 72 includes the subject matter of Example 61, the first cipher system comprising a position dependent cipher system and the second cipher system comprising a position independent cipher system.

Example 73 includes the subject matter of Example 61, the memory operation request including a read request of the target information.

Example 74 includes the subject matter of Example 73, the target information comprising a memory page stored in the first encryption environment and the read request comprising a paging-out operation.

Example 75 includes the subject matter of Example 61, the memory operation request including a write request of the target information.

Example 76 includes the subject matter of Example 75, the target information comprising a memory page stored in the first encryption environment and the write request comprising a paging-in operation.

Example 77 includes the subject matter of Example 61, comprising means for determining the memory operation request includes communication of the target data from the first encryption environment to the second encryption environment based on a bit asserted by a storage controller.

Example 78 includes the subject matter of Example 61, comprising means for determining the memory operation request includes communication of the target data from the first encryption environment to the second encryption environment based on one or more address bits in the memory operation request.

Example 79 includes the subject matter of Example 61, the TEE comprising the encryption engine.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
 a processor;
 main memory coupled to the processor, comprising a first address and a first encryption environment to utilize a position dependent cypher system;
 secondary memory coupled to the processor, comprising a second address and a second encryption environment to utilize a position independent cypher system; and
 the main memory comprising instructions that when executed by the processor cause the processor to:
  determine a memory operation request includes communication of target information from the first address to the second address; and
  translate the target information from the first encryption environment to the second encryption environment, wherein translation of the target information from the first encryption environment to the second encryption environment utilizes the first address and translates the target information from the cypher system of the first encryption environment to the cypher system of the second encryption environment.

2. The apparatus of claim 1, the memory comprising instructions that when executed by the processor cause the processor to translate the target information from the first encryption environment to the second encryption environment with a position dependent cipher system that utilizes the first address.

3. The apparatus of claim 1, the memory comprising instructions that when executed by the processor cause the processor to decrypt the target information with the position dependent cipher system and encrypt the target information with the position independent cipher system to translate the target information from the first encryption environment to the second encryption environment.

4. The apparatus of claim 3, the memory comprising instructions that when executed by the processor cause the processor to encrypt the target information with the position independent cipher system based on metadata associated with the target information.

5. The apparatus of claim 4, the metadata associated with the target information comprising one or more of a counter value and an integrity check value.

6. The apparatus of claim 5, the memory comprising instructions that when executed by the processor cause the processor to:
 update the metadata associated with the target information; and
 communicate the target information after translation and the metadata after update to the second memory for storage at the second address.

7. The apparatus of claim 6, the metadata associated with the target information comprising a counter value and the memory comprising instructions that when executed by the processor cause the processor to increment the counter value to update the metadata associated with the target information.

8. The apparatus of claim 1, the memory comprising instructions that when executed by the processor cause the processor to translate the target information from the first encryption environment to the second encryption environment when an indicator bit is set.

9. At least one non-transitory computer-readable medium comprising a set of instructions that, in response to being executed by a processor circuit of a computer system comprising main memory and secondary memory, cause the processor circuit to:
   determine a memory operation request includes communication of target information from a first address in a first memory to a second address in a second memory, wherein the first memory is located in the main memory and comprises a first encryption environment and the second memory is located in the secondary memory and comprises a second encryption environment, the first encryption environment to utilize a position dependent cypher system and the second encryption environment to utilize a position independent cypher system; and
   translate the target information from the first encryption environment to the second environment, wherein translation of the target information from the first encryption environment to the second encryption environment utilizes the first address and translates the target information from the cypher system of the first encryption environment to the cypher system of the second encryption environment.

10. The at least one non-transitory computer-readable medium of claim 9, comprising instructions that, in response to being executed by the processor circuit, cause the processor circuit to translate the target information from the first encryption environment to the second encryption environment with a position dependent cipher system that utilizes the first address.

11. The at least one non-transitory computer-readable medium of claim 9, comprising instructions that, in response to being executed by the processor circuit, cause the processor circuit to decrypt the target information with the position dependent cipher system and encrypt the target information with the position independent cipher system to translate the target information from the first encryption environment to the second encryption environment.

12. The at least one non-transitory computer-readable medium of claim 11, comprising instructions that, in response to being executed by the processor circuit, cause the processor circuit to encrypt the target information with the position independent cipher system based on metadata associated with the target information.

13. The at least one non-transitory computer-readable medium of claim 12, the metadata associated with the target information comprising one or more of a counter value and an integrity check value.

14. The at least one non-transitory computer-readable medium of claim 13, comprising instructions that, in response to being executed by the processor circuit, cause the processor circuit to:
   update the metadata associated with the target information; and
   communicate the target information after translation and the metadata after update to the second memory for storage at the second address.

15. The at least one non-transitory computer-readable medium of claim 14, the metadata associated with the target information comprising a counter value and comprising instructions that, in response to being executed by the processor circuit, cause the processor circuit to increment the counter value to update the metadata associated with the target information.

16. The at least one non-transitory computer-readable medium of claim 9, comprising instructions that, in response to being executed by the processor circuit, cause the processor circuit to translate the target information from the first encryption environment to the second encryption environment when an indicator bit is set.

17. A computer-implemented method, comprising:
   determining, at processor of a computing device coupled to a main memory of the computing device and a secondary memory of the computing device, a memory operation request includes communication of target information from a first address in a first memory to a second address in a second memory, wherein the first memory is located in the main memory and comprises a first encryption environment and the second memory is located in the secondary memory and comprises a second encryption environment, the first encryption environment to utilize a position dependent cypher system and the second encryption environment to utilize a position independent cypher system; and
   translating, at the processor, the target information from the first encryption environment to the second encryption environment, wherein translation of the target information from the first encryption environment to the second encryption environment utilizes the first address and translates the target information from the cypher system of the first encryption environment to the cypher system of the second encryption environment.

18. The computer-implemented method of claim 17, comprising translating the target information from the first encryption environment to the second encryption environment with a position dependent cipher system that utilizes the first address.

19. The computer-implemented method of claim 17, comprising decrypting the target information with the position dependent cipher system and encrypt the target information with the position independent cipher system to translate the target information from the first encryption environment to the second encryption environment.

20. The computer-implemented method of claim 19, comprising encrypting the target information with the position independent cipher system based on metadata associated with the target information.

21. The computer-implemented method of claim 20, comprising:
   updating the metadata associated with the target information; and
   communicating the target information after translation and the metadata after update to the second memory for storage at the second address.

22. The computer-implemented method of claim 17, comprising translating the target information from the first encryption environment to the second encryption environment when an indicator bit is set.

* * * * *